United States Patent [19]

Huyer

[11] Patent Number: 4,981,290
[45] Date of Patent: Jan. 1, 1991

[54] OPEN ROOF CONSTRUCTION FOR A VEHICLE

[75] Inventor: Johannes N. Huyer, BN Velserbroek, Netherlands

[73] Assignee: Vermeulen-Hollandia Octrooien II B.V., Netherlands

[21] Appl. No.: 432,513

[22] Filed: Nov. 7, 1989

[30] Foreign Application Priority Data

Nov. 10, 1988 [NL] Netherlands ............. 8802771

[51] Int. Cl.$^5$ ............................................. B60J 7/05
[52] U.S. Cl. ........................................ 296/214; 296/221; 296/223
[58] Field of Search ............... 296/214, 221, 223

[56] References Cited

U.S. PATENT DOCUMENTS 4,671,564 6/1987 Sumida et al. ................. 296/214
4,844,534 7/1989 Boots ............................. 296/214

FOREIGN PATENT DOCUMENTS

3444841A1 12/1984 Fed. Rep. of Germany .

Primary Examiner—Dennis H. Pedder
Attorney, Agent, or Firm—Kinney & Lange

[57] ABSTRACT

An open roof construction for a vehicle having an opening (2) in the fixed roof (1) comprises a frame (3) and an outer panel (4) adjustably supported by the frame. The outer panel is movable by means of a driving slide (11) at least between a closed position in which it closes the opening (2) in the fixed roof (1) and a backwardly and upwardly inclined venting position in which it releases a venting opening. An inner panel (5) is slidably provided under the outer panel (4) and is slidably between a front position in which a passage (6) in the frame (3) is closed, and a backwardly slid position in which the passage (6) in front of the front edge of the inner panel (5) is released. A displacement mechanism for the inner panel (5) is adapted to slide the inner panel (5a distance backwardly when the outer panel (4) is moved from the closed position to the venting position. The displacement mechanism is provided with a reversing element (13) converting a forward displacemnet of the driving slide (11) into a backward movement of the inner panel (5). The reversing element (13) comprises a flexible elongated reversing element being turned substantially 180° on one side of the passage (6) in the frame (3).

10 Claims, 4 Drawing Sheets

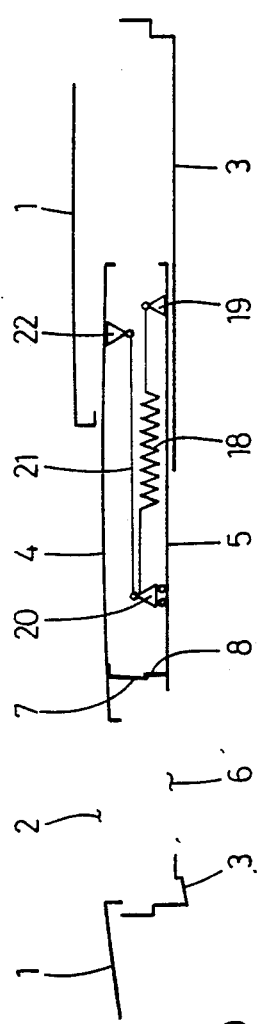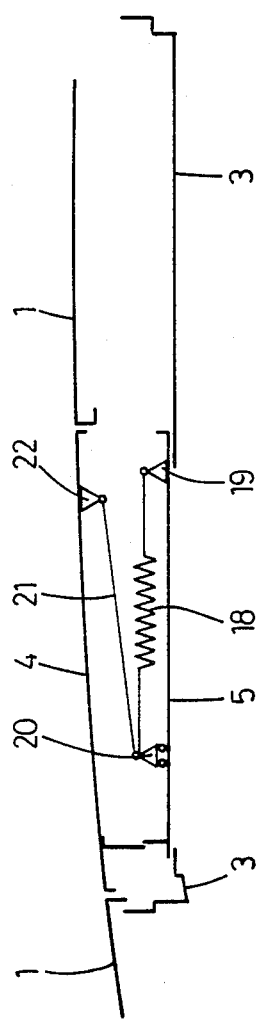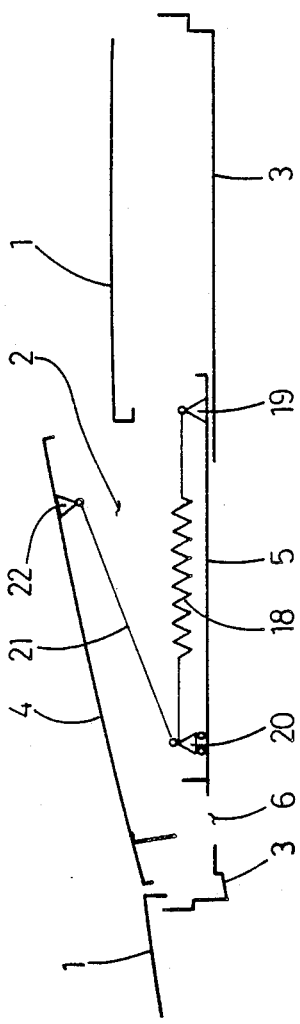
fig.6
fig.5
fig.7

OPEN ROOF CONSTRUCTION FOR A VEHICLE

The invention relates to an open roof construction for a vehicle having an opening in the fixed roof, comprising a frame; an outer panel adjustably supported by the frame, the outer panel being movable by means of a driving slide at least between a closed position in which it closes the opening in the fixed roof and a backwardly and upwardly inclined venting position in which it releases a venting opening; an inner panel slidably provided under the outer panel and being slidable between a front position in which a passage in the frame is closed, and a backwardly slid position in which the passage in front of the front edge of the inner panel is released; and displacement means for the inner panel sliding the inner panel a distance backwardly when the outer panel is moved from the closed position to the venting position, said displacement means being provided with a reversing element converting a forward displacement of the driving slide into a backward movement of the inner panel.

In a known embodiment of such open roof construction the reversing element consists of a lever being attached to the water gutter of the open roof construction pivotable about a vertical axis and being adapted to be engaged by the driving means on one hand and to come into contact with an upright edge of the inner panel on the other hand. The structure of the lever and the co-operating element of the known open roof construction is rather complicated.

Furthermore, there is known an open roof construction wherein the driving slide and the inner panel are each provided with a gear rack, and between both gear racks there being provided a single or multiple gear wheel journalled in the frame, the gear wheel reversing the movements of the driving slide and transferring them to the inner panel, if necessary in a reduced or accelerated manner. This structure is very complicated and occupies a lot of space.

In an other known open roof construction the free end of a pull and push cable used for the drive is utilized for sliding the inner panel backwardly. In this construction one is dependent of the use of and the position of the pull and push cable.

It is an object of the invention to provide an improved open roof construction of the type mentioned in the preamble having a simple reversing element of the displacement means for the inner panel.

For this purpose the open roof construction according to the invention is characterized in that the reversing element comprises a flexible elongated reversing element being turned substantially 180° on one side of the passage in the frame.

In this way there is provided a very simple reversing element which, as a consequence of it simplicity, will give little rise to failures and will therefore contribute to the operational reliability of the open roof construction. The structural simplicity of the reversing element also enables an inexpensive manufacturing. Furthermore the reversing element requires only little space, so that little concession is to be made in this respect. Another advantage is the independence of the reversing element of the type of driving. The reversing elements could be used both in combination with a pull and push cable and with other types of drives. When a pull and push cable is used the motor or crank therefore can be positioned both in front of or behind the roof opening.

In a favourable embodiment of the open roof construction according to the invention the flexible elongated reversing element is provided separate from of the driving slide and in that the driving slide being adapted to operatively come into engagement with the flexible elongated reversing element only when the outer panel is tilted from the closed position to the venting position.

Due to this feature the reversing element is only moved when it is in operation, so that the wear of the reversing element is reduced to a minimum, while furthermore only a short guide for the reversing element is required.

It is advantageous if the flexible elongated reversing element is compression resistant and has two backwardly turned free ends, of which the one end is adapted to engage the inner panel and of which the other end is adapted to be engaged by the driving slide.

In this way a compressive force exerted by the driving slide onto the reversing element is reversed by the reversing element and is transmitted to the inner panel.

Herein, the reversing element may be provided near the front end of a stationary guide for the driving slide.

As a result the drive and guide structure should hardly be adapted to the reversing element.

In an embodiment of the open roof construction wherein, upon a displacement of the outer panel from the venting position to the close position, the inner panel is slid forwardly to the closed position by the displacement means, it is favourable according to the invention that the displacement means is further provided with a spring means engaging the inner panel and loading it forwardly.

The invention will hereafter be elucidated with reference to the drawing schematically showing two embodiments of the open roof construction according to the invention by way of example.

FIGS. 5-7 are schematic longitudinal sectional views, corresponding to those of FIGS. 2-4 and showing an alternative embodiment of the open roof construction according to the invention.

Figure 1:
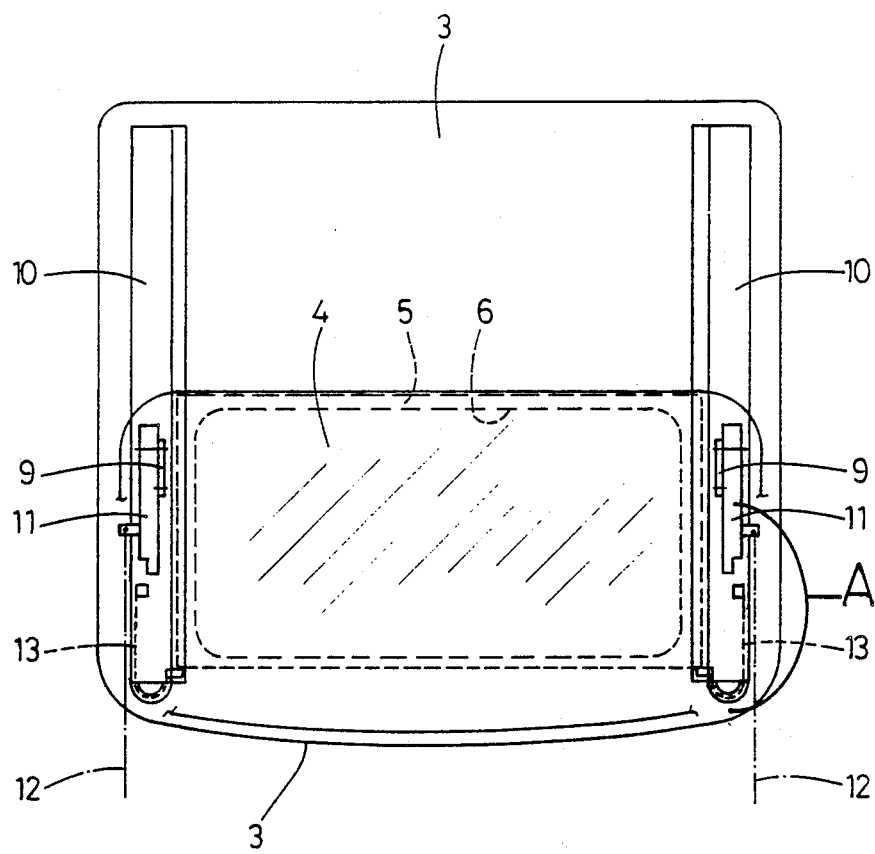
FIG. 1 is a schematic plan view of a first embodiment of the open roof construction according to the invention wherein all parts that are not relevant to the invention are omitted.

The drawing shows embodiments of an open roof construction for a vehicle of which the fixed roof 1 is provided with an aperture 2.

Figure 3:
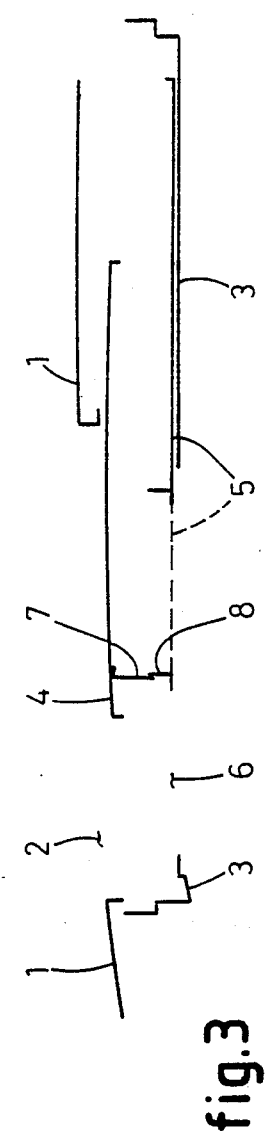
FIGS. 2-4 show schematic longitudinal sectional views of the open roof construction of FIG. 1, in several positions.
Figure 2:
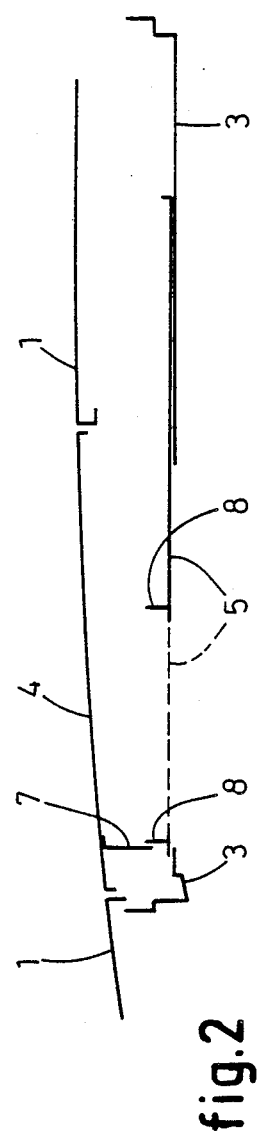
Figure 4:
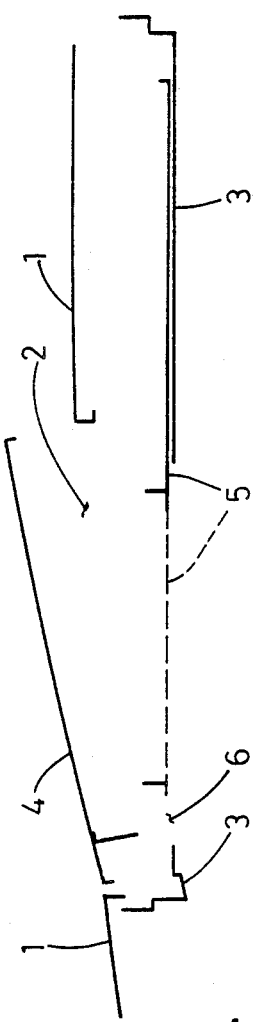
Figure 9:
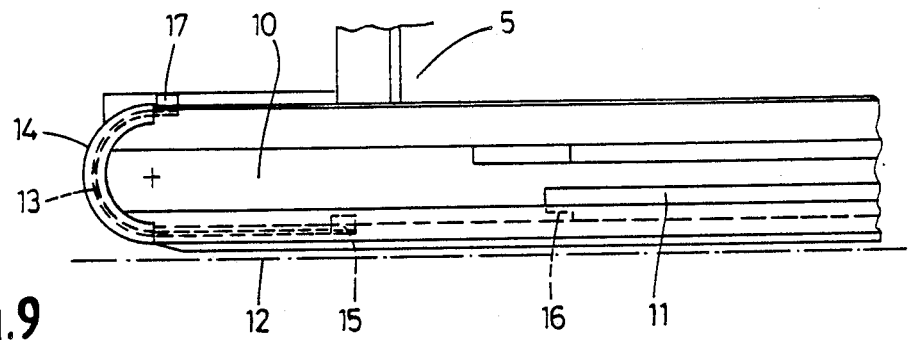
FIGS. 8-10 show detail A of FIG. 1 on an enlarged scale, and in positions corresponding to those of FIGS. 2-4.
Figure 8:
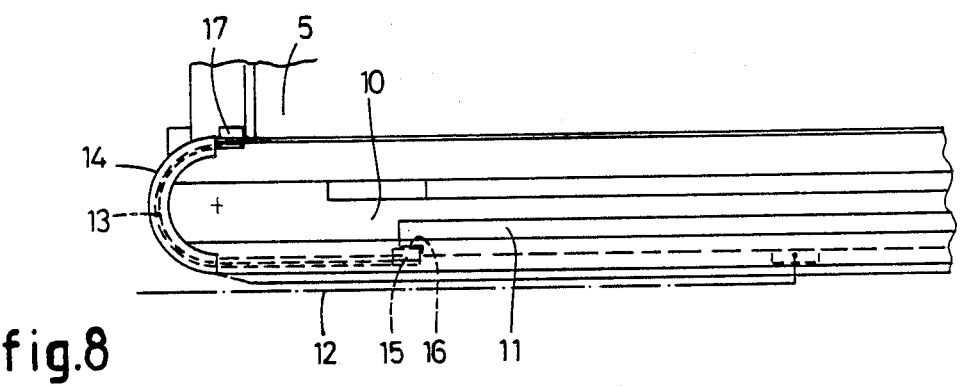
Figure 10:
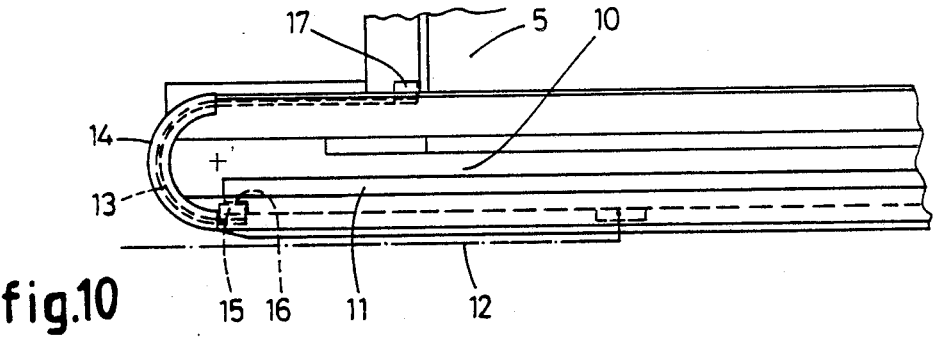

This open roof construction includes an outer panel 4 supported by a stationary frame 3, and an inner panel 5. In the embodiment of FIGS. 2-4 the outer panel 4 is made of a transparant material, such as glass, and the inner panel 5, in that case, being constructed as a sunshade for selectively closing off to light a passage opening 6 in the stationary frame 3, which lies substantially under the roof aperture 2. In the embodiment of FIGS. 5-7 the outer panel 4 is made of metal or an other opaque material, and the inner panel 5 has the function of a lining screening the unfinished lower side of the outer panel 4 and aiding in the insulation of noise and heat.

In both embodiments the outer panel 4 is adapted to be moved from the closed position in the roof aperture 2 (FIGS. 2, 5) into a lower position in which the outer panel 4 and the inner panel 5 can be slid backwardly between the fixed roof 1 of the vehicle and the rear portion of the stationary frame 3 to a completely or partially opened position (FIGS. 3, 6) and from there the outer panel 4 can be displaced back again to the closed position.

In the embodiment of FIGS. 2-4 it is possible, when the outer panel 4 is in backwardly displaced positions, to manually adjust the inner panel 5 serving as a sunshade between a varying front position determined by stops 7, 8 on the outer panel 4 and the inner panel 5 and a completely backwardly slid opened position (see FIG. 3). Contrary thereto, the outer panel 4 of the embodiment shown in FIGS. 5-7 is fixedly connected to the inner panel 5 during backward and forward sliding movements thereof (FIG. 6).

It is further possible to bring the outer panel 4 from its closed position into a backwardly and upwardly inclined venting position (FIGS. 4, 7) and to bring it back again from this venting position to the closed position. When the outer panel 4 is moved to the venting position the inner panel 5 is moved by a displacement means, to be described in detail, from its front position a limited distance backwardly so as to create a venting opening on the front side of the passage 6 in the stationary frame (FIGS. 4, 7). In the embodiment of FIGS. 2-4 the inner panel 5 is adapted to be displaced by hand from this limited backwardly slid position further backward and forward, again up to the limited backwardly slid position (see FIG. 4). In the embodiment shown in FIGS. 5-7, when moving the outer panel 4 from the venting position back to the closed position, the inner panel is automatically slid again to its front position by a displacement means to be described in further detail.

The adjustment of the outer panel 4 is effected in a manner known per se according to which the outer panel 4 is adjusted by a lifting means 9 provided on one or either side, as shown, of the passage 6. Each lifting means 5 is controlled by a driving slide 11 guided in a horizontal longitudinal stationary guide 10 on the respective side of the passage 6, the driving slide 11 being displacable by a pull and push cable 12 that can be driven electrically or manually.

FIGS. 1 and 8-10 show the displacement means for the inner panel 5 mentioned hereinbefore, with which it can be slid backwardly a limited distance when the outer panel 4 is moved from the closed position to the venting position. Said displacement means includes a flexible elongated reversing element 13, preferably of plastic, such as nylon, said reversing element being positioned at the front end of each guide 10 and being turned 180° around a bend 14 in the guide. Both free ends of the reversing element 13 are directed backwardly. The outer free end of the reversing element 13 is provided with an inwardly projecting cam 15 with which the driving slide 11 which is slidably guided in the guide 10, can come into contact. Then the cam 15 is received in a recess 16 on the front side of the driving slide 11. The other end of the reversing element 13 adjacent said passage has an inwardly projecting cam 17 adapted to engage the front side of the inner panel 5 which is guided with each side edge in a slot of the respective guide 10.

The reversing element 13 is compression resistant and is therefore able to transmit the force exerted by the driving slide 11 onto the cam 15, to the cam 17 and the inner panel 5. In this manner the reversing element 13 is able to convert the forward displacement of the driving slide 11 used to bring the outer panel 4 to the venting position, into a backward displacement of the inner panel 5 (compare FIGS. 8 and 9). The reversing element 13 constructed as a separate part always remains near the front end of the guide 10, so that, when the outer panel 4 is displaced backwardly by sliding the driving slide 11 further backwardly, the driving slide 11 releases from the reversing element 13 (see FIG. 8).

In the embodiment of FIGS. 2-4 the displacement means does not include a mechanism for displacing the inner panel 4 forwardly again when the outer panel 4 is moved back from the venting position to the closed position. This has to be done by hand thereby simultaneously urging the reversing element 13 back to the initial position.

In the embodiment of FIGS. 5-7 the displacement means includes a separate mechanism for displacing the inner panel 5 forwardly when the outer panel 4 is moved from the venting position to the closed position. As shown in FIGS. 5-7 this mechanism includes a longitudinally positioned tension spring 18 engaging with its rear end to a bracket 19 on the inner panel 5 and being connected with its front end to a retention slide 20 guided on the inner panel 5 or in the guide 10. This retention slide 20 is pivotally connected to a bracket 22 on the lower side of the outer panel 4 by means of a pivotable connection arm 21 and is therefore slid along upon a sliding movement of the outer panel 4, but it is maintained substantially stationary upon a tilting movement of the outer panel 4.

When the outer panel 4 is tilted from the closed position to the venting position, the inner panel 5 is slid backwardly by the reversing element 13 against the force of tension spring 18 (compare FIGS. 8 and 10), while the retention slide 20 is substantially held in its position. When the outer panel 4 is tilted back to the closed position, the inner panel 5 is automatically displaced forwardly by the tension spring 18 and the inner panel 5 follows as it were the displacement of the driving slide 9 in opposite direction through the reversing element 13.

According to the invention there is provided an open roof construction for a vehicle, of which the reversing element of the displacement means for the inner panel has a very simple structure and therefore is trouble free. The reversing element further requires only very little space and also does not occupy any space in front of the passage in the frame, so that it is for instance easy to provide a wind deflector at the front edge of the roof opening without interfering with the reversing element.

The invention is not restricted to the embodiments shown in the drawing and described herein before by way of example, which can be varied in different ways within the scope of the invention.

I claim:

1. An open roof construction for a vehicle having an opening (2) in the fixed roof (1), comprising
    a frame (3) having a passage opening (6) therein substantially aligned with the opening in the roof;
    an outer panel (4) adjustably supported by the frame, the outer panel being movable by means of a driving slide (11) between a closed position in which it closed the opening (2) in the fixed roof (1) and a backwardly and upwardly inclined venting position in which it exposes a venting opening;

an inner panel (5) slidably provided under the outer panel (4) and being slidable between a front position to close the passage opening (6) in the frame (3) and a backwardly slid position in which the passage opening (6) forwardly of a forward edge of the inner panel (5) is open; and displacement means for the inner panel (5) sliding the inner panel (5) a distance backwardly when the outer panel (4) is moved from the closed position to the venting position, said displacement means being provided with a reversing element (13) converting a forward displacement of the driving slid (11) into a backward movement of the inner panel (5), the reversing element (13) comprising a flexible elongated reversing element being turned substantially 180° on one lateral side of the passage opening (6) in the frame (3) and at terminal ends of the turn having portions which move substantially parallel to said one lateral side, and, in operation, forming a driving connection between the driving slide (11) and the inner panel (5).

2. An open roof construction according to claim 1, wherein the flexible elongated reversing element (13) is provided separately of the driving slide (11), and the driving slide (11) being adapted to operatively come into engagement with the flexible elongated reversing element (13) only when the outer panel (4) is tilted from the closed position to the venting position.

3. An open roof construction according to claim 2, wherein the flexible elongated reversing element (13) is compression resistant and has two backwardly extending free ends, one free end being adapted to engage the inner panel (5) and the other free end being adapted to be engaged by the driving slide (11).

4. An open roof construction according to claim 3 wherein the flexible elongated reversing element (13) has a laterally projecting cam (15, 17) at each of its free ends.

5. An open roof construction according to claim 1, wherein the flexible elongated reversing element (13) is made of plastic, such as nylon.

6. An open roof construction according to claim 1, wherein on either of two said lateral sides of the passage (6) in the frame (3) there is provided a driving slide (11) and a cooperating flexible elongated reversing element (13).

7. An open roof construction for a vehicle having an opening (2) in the fixed roof (1), comprising a frame (3) having a passage opening (6) therein substantially aligned with the opening in the roof;

an outer panel (4) adjustably supported by the frame, the outer panel being movable by means of a driving slide (11) between a closed position in which it closes the opening (2) in the fixed roof (1) and a backwardly and upwardly inclined venting position in which it exposes a venting opening;

an inner panel (5) slidably provided under the outer panel (4) and being slidable between a front position to close the passage opening (6) in the frame (3), and a backwardly slid position in which the passage opening (6) forwardly of a forward edge of the inner panel (5) is open; and displacement means for the inner panel (5) sliding the inner panel (5) a distance backwardly when the outer panel (4) is moved from the closed position to the venting position, said displacement means being provided with a reversing element (13) converting a forward displacement of the driving slide (11) into a backward movement of the inner panel (5), the reversing element (13) comprising a compression resistant flexible elongated reversing element separate from the driving slide and being doubled back on itself substantially 180° on one lateral side of the passage opening (6) in the frame (3) to form two backwardly extending free ends, one free end being adapted to engage the inner panel (5) and the other free end being adapted to be engaged by the driving slide to form a driving connection between the driving slide (11) and the inner panel (5), the driving slide (11) being adapted to operatively come into engagement with the flexible elongated reversing element (13) only when the outer panel (4) is tilted from the closed position to the venting position, the flexible elongated reversing element (13) being provided near the front end of a stationary guide (10) for the driving slide (11).

8. An open roof construction for a vehicle having an opening (2) in the fixed roof (1), comprising a frame (3) having a passage opening (6) therein substantially aligned with the opening in the roof;

an outer panel adjustably supported by the frame, the outer panel being movable by means of a driving slide (11) between a closed position in which it closes the opening (2) in the fixed roof (1) and a backwardly and upwardly inclined venting position in which it exposes a venting opening;

an inner panel (5) slidably provided under the outer panel (4) and being slidable between a front position to close the passage opening (6) in the frame (3), and a backwardly slid position in which the passage opening (6) forwardly of a forward of the inner panel (5) is open; and displacement means for the inner panel (5) sliding the inner panel (5) a distance backwardly when the outer panel (4) is moved from the closed position to the venting position, said displacement means being provided with a reversing element (13) converting a forward displacement of the driving slide (11) into a backward movement of the inner panel (5), the reversing element (13) comprising a flexible elongated reversing element being turned substantially 180° into a U shape on one lateral side of the passage opening (6) in the frame (3) and, in operation, forming a driving connection between the driving slide (11) and the inner panel (5) wherein upon a displacement of the outer panel (4) from the venting position to the closed position, the inner panel (5) is slid forwardly to the closed position by the displacement means, and wherein the displacement means is further provided with a spring means (18) engaging the inner panel (5) and spring loading it forwardly.

9. An open roof construction according to claim 8, wherein the spring means (18) is an elongated tension spring.

10. An open roof construction according to claim 9, wherein the outer panel (4) is also slidable backwardly below the fixed roof together with the inner panel (5), and wherein the tension spring (18) is attached to the inner panel (5) on the one hand and to a retention means (20) on the other hand, said retention means (20) being slidably guided in longitudinal direction together with the outer panel (4) and being connected for this purpose to the outer panel (4) through a pivotable connection means (21).

* * * * *

UNITED STATES PATENT AND TRADEMARK OFFICE
CERTIFICATE OF CORRECTION

PATENT NO. : 4,981,290

DATED : January 1, 1991

INVENTOR(S) : Johannes N. Huyer

It is certified that error appears in the above-identified patent and that said Letters Patent is hereby corrected as shown below:

Col. 6, line 23, after "panel", insert --(4)--.

Signed and Sealed this

Twenty-third Day of June, 1992

Attest:

DOUGLAS B. COMER

Attesting Officer

Acting Commissioner of Patents and Trademarks